Figure 1:
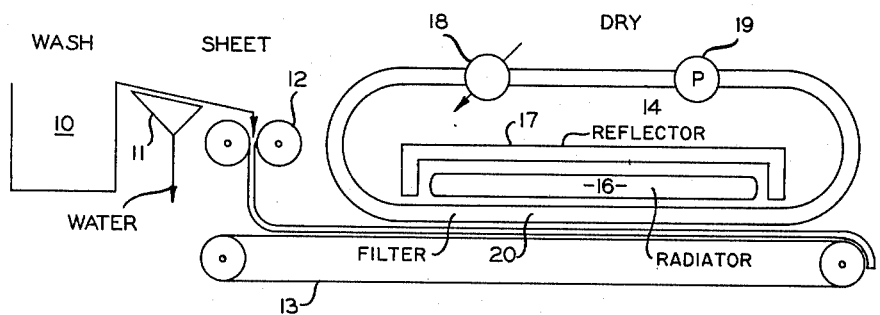

Aug. 18, 1964

D. L. McKAY 3,145,088

RUBBER DRYING

Filed March 3, 1961

INVENTOR.
D. L. MC KAY

BY Hudson and Young.
ATTORNEYS

United States Patent Office 3,145,088
Patented Aug. 18, 1964

3,145,088
RUBBER DRYING
Dwight L. McKay, Bartlesville, Okla., assignor to Phillips Petroleum Company, a corporation of Delaware
Filed Mar. 3, 1961, Ser. No. 93,108
6 Claims. (Cl. 34—4)

This invention relates to a process for drying rubber.

Many types of rubber are dried in the form of a crumb or sheet. The earliest of these was natural rubber which is obtained in crumb form following coagulation of the latex. Quite similar is the rubber crumb obtained in the familiar emulsion polymerization process to produce rubbery copolymers of butadiene and styrene. Butyl rubber, a copolymer of a minor amount of a conjugated diene, usually isoprene, and a major amount of a monoolefin, usually isobutylene, is frequently recovered in crumb form from a solution of the rubber in a solvent. Newer forms of synthetic rubbers have been developed and among these are the diene polymers produced in solution using organometal initiators. Another new type is the ethylene-propylene copolymer. A convenient method for recovery of the rubber from solution is to use a steam stripping process. This produces wet rubber crumb.

In all of these systems a method of drying the rubber crumb is necessary. In prior operation, comparatively low temperature tunnel driers have been used. A newer development is to use extruders. However, each of these methods leaves something to be desired.

An object of this invention is to provide an improved method of drying rubber. A further object of this invention is to provide a rubber drying process using radiant heating.

Broadly, my invention resides in a process of drying wet rubber comprising passing said rubber through a radiant heat zone wherein said rubber is exposed to radiation from a source at a temperature of 600 to 3500° F. for 0.5 second to 10 minutes, wherein at least half of the total radiant energy from the source lies within the range of 1 to 7 microns wavelength. Another aspect of my invention resides in a process of drying wet rubber comprising providing a radiant heat source in which at least half of the total radiant energy from the source lies within the range of 1 to 7 microns wavelength but substantially no energy in the range of 3 to 4 microns which is absorbable by the rubber and exposing said rubber to said source for a time of 0.5 second to 10 minutes, the temperature of the source being in the range of 600 to 3500° F.

The important features of my invention are apparent from these broad statements of the invention. The temperatures utilized are far higher and the times much shorter than those previously used. This not only increases the quantity of rubber treated but reduces the effect of heating for long periods of time, which causes some degradation in the rubber properties. In a preferred modification of my invention, the spectral distribution of the energy from the radiant source is selected to maximize the amount of energy in the wavelength regions absorbable by water while minimizing the amount of radiant energy absorbable by the rubber. This can be done by concentrating the infrared heat energy in the spectral ranges of 1 to 3 and 4 to 7 microns wavelength. Best results are obtained by drying the rubber in the form of a thin sheet which can be conveniently made by passing the wet crumb between hot or cold rolls. Cold rolls generally produce a continuous sheet while hot rolls produce a lace-like sheet of the wet crumb. In any event, the sheet can be from 0.001 to 1 inch thick but is preferably 0.01 to 0.1 inch thick. The energy absorbed by the mixture should be sufficient to vaporize the liquid but not sufficient to heat the rubber hot enough to damage it. Because of the short times involved the rubber can reach a fairly high temperature, i.e., 600° F.

Occasionally, additional heated rolls can be used for final drying but this is generally unnecessary.

The drawing illustrates, in schematic form, the process of my invention. In FIGURE 1, a conventional crumb wash tank 10 is shown. Rubber and water overflow from this tank and pass over a screen 11, this removing free water. Thereafter, the rubber is passed between rolls 12 to produce a sheet. This sheet is dropped on to endless moving belt 13, this moving belt passing it through radiant heating zone 14. Radiant zone 14 comprises a radiator 16 and reflector 17. In this figure, I have shown one type of filter system which will prevent passage of radiation primarily absorbed by the rubber to the sheet of rubber crumb. This filter comprises a zone 20 positioned between belt 13 and the energy source 16. This filter preferably contains a water free hydrocarbon solution of the rubber being dried. This solution is heated by the rubber's absorption of some of the radiant energy, cooled in cooler 18, and returned to the filter zone 20. A pump 19 provides the circulation. Such a filter can be used to filter up to 20 percent of the energy from the source to remove radiant energy in the range of 3 to 4 microns wavelength.

Obviously, other methods of obtaining the proper radiaiton can be employed. Those skilled in the art know that radiation of a desired spectral distribution can be achieved by: The use of optical filters, proper selection of filaments or radiatiing surfaces, selection of emission temperatures, or other techniques.

Figure 2:
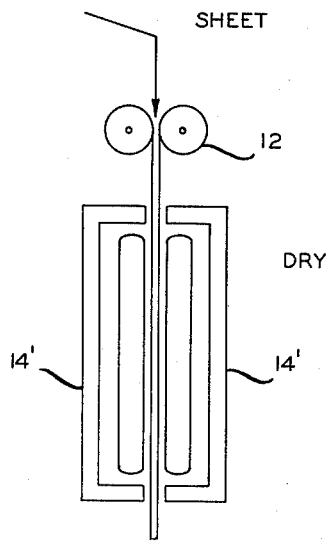

FIGURE 2 illustrates a modification of the invention. After passing through the rolls 12, the unsupported sheet passes downwardly between radiant heating zones 14' of the type of FIGURE 1. To obtain the preferred method of heating, radiation of differing spectral characteristics can be supplied by each of the heating zones 14'.

The following examples illustrate operation according to my invention.

*Example I*

A butadiene polymer of approximately 95 percent cis 1,4-addition was prepared by polymerizing butadiene in a toluene solvent in the presence of an initiator comprising a mixture of triisobutylaluminum, titanium tetrachloride, and titanium tetraiodide. Following polymerization the catalyst was inactivated and an antioxidant added. By steam stripping, a rubber crumb was formed. This rubber had a Mooney viscosity (ML-4 at 212° F.) of 43.5. The rubber crumb containing 19.52 weight percent water was sheeted in a two-roll mill to provide a sheet 0.050 inch in thickness. Portions of this sheet were placed upon wire mesh and heated in a Lindberg muffle furnace for short periods of time. The spectral distribution of the radiant energy approximates that of a black body radiator. The time and temperature for a series of runs are shown in the following table:

| Furnace Temp., °F. | Exposure Time (Sec.) | Water Content (wt. percent) | Mooney Viscosity (ML-4 @ 212° F.) | Wavelength of Energy Maximum (Microns)[1] | Percent of total Energy in 1-7 Micron Range |
|---|---|---|---|---|---|
| 1,200 | 20 | 1.59 | 39.8 | 3.1 | 77 |
| 1,000 | 32 | 0.89 | 40.8 | 3.6 | 71 |
| 800 | 50 | 2.42 | 42.0 | 4.1 | 62 |
| 800 | 70 | 0.25 | 41.2 | 4.1 | 62 |

[1] Wavelength of the energy maximum is the peak of the radiation curve, the point of greatest energy concentration.

Examination of this table shows that the rubber was dried from approximately 20 percent to a low figure without appreciable change in Mooney viscosity.

*Example II*

Using the same type of rubber of Example I, containing 6.32 weight percent water and having a Mooney viscosity of 44.3 (ML-4 at 212° F.), an additional series of runs were made using a Lindberg oven operated to provide black body radiation. The inherent viscosity of the rubber was 2.47. Data on these runs are set forth in the following table:

| Furnace Temp., °F. | Exposure Time (Sec.) | Water Content (wt. percent) | Mooney Viscosity (ML-4 @212° F.) | Inherent Viscosity [1] | Wavelength of Energy Maximum (Microns) [1] | Percent of Total Energy in 1-7 Micron Range |
|---|---|---|---|---|---|---|
| 720 | 25 | 0.31 | 42.4 | 2.43 | 4.4 | 57 |
| 750 | 20 | 0.75 | 42.2 | 2.32 | 4.3 | 59 |
| 720 | 22 | 0.00 | 38.8 | 2.31 | 4.4 | 57 |
| 730 | 22 | 0.00 | 44.3 | 2.35 | 4.4 | 58 |
| 600 | 35 | 1.13 | 42.9 | 2.53 | 4.9 | 50 |

[1] Determined in toluene at 25° C.

These data show good drying without a serious change in Mooney viscosity or inherent viscosity.

*Example III*

In the same maner, additional portions of the rubber were dried using a single Schwank-type burner with heating from one side. This burner is shown in U.S. Patent 2,775,294. It operates at temperatures as high as 1600° F. where the radiation peak is located at approximately 2.5 microns. This gives 85 percent of the total radiant energy from the source in the range of 1 to 7 microns wavelength. The rubber was the type of Example I and had a water content of 7.96 weight percent and a Mooney viscosity of 44.3. Each piece of rubber was about 6 inches in diameter and 0.050 inch thick. The results were shown in the following table:

| Run Test | Distance to Burner, Inches | Drying Time-Secs. | Water Content (wt. percent) | Inherent Viscosity | Mooney Viscosity (ML-4 at 212° F.) |
|---|---|---|---|---|---|
| 1 | 15 | 60 | 4.72 | 2.52 | 45.6 |
| 2 | 15 | 120 | 1.89 | 2.53 | 45.3 |
| 3 | 9 | 90 | 0.07 | 2.26 | 36.8 |
| 4 | 9 | 90 | 0.16 | 2.04 | 41.6 |
| 5 | 9 | 85 | 0.10 | 2.42 | 39.4 |
| 6 | 9 | 80 | 0.19 | 2.44 | 40.5 |
| 7 | 9 | 75 | 0.17 | 2.02 | 45.4 |

It will be apparent that my invention, a physical process, is not limited to a particular polymer. Furthermore, liquids other than water can be removed by my process.

As many possible embodiments can be made of this invention without departing from the scope thereof, it is to be understood that all matter herein set forth is to be interpreted as illustrative and not as unduly limiting the invention.

I claim:
1. In a process of drying wet rubber crumb obtained from a wash zone using a radiant heat source in which at least one-half of the total radiant energy from the source lies in the range of 1 to 7 microns wavelength, the improvement comprising filtering up to 20 percent of the energy from the source to remove radiant energy in the range of 3 to 4 microns wavelength, and exposing said rubber to the thus filtered radiation.

2. A process according to claim 1 wherein there is passed between the said heat source and said wet rubber crumb a solution capable of filtering, from said radiant heat, energy in the range of 3 to 4 microns wavelength.

3. A process according to claim 2 wherein said solution is a substantially water-free hydrocarbon solution of the rubber crumb being dried.

4. A process according to claim 1 wherein there is continuously cycled between said radiant heat source and the rubber crumb being dried a filtering medium capable of absorbing radiant energy in the range of 3 to 4 microns and wherein said filtering medium when it has absorbed heat is passed to a cooling zone for the removal of heat therefrom for reuse.

5. A process of drying wet rubber crumb obtained from a wash zone comprising providing a radiant heat source in which at least half of the total radiant energy from the source lies within the range of 1 to 7 microns wavelength, filtering up to 20 percent of the energy from the source to remove radiant energy in the range of 3 to 4 microns wavelength, and exposing said rubber to said filtered source for a time of 0.5 second to 10 minutes, the temperature of the source being in the range of 600 to 3500° F.

6. The process of clam 5 wherein said filitering is accomplished by passing said radiant energy through a water-free hydrocarbon solution of the rubber being dried.

References Cited in the file of this patent
UNITED STATES PATENTS

| | | |
|---|---|---|
| 1,518,141 | Gage | Dec. 9, 1924 |
| 1,681,276 | Bell | Aug. 21, 1928 |
| 2,139,797 | Boerstler | Dec. 13, 1938 |
| 2,498,560 | Leeth | Feb. 21, 1950 |
| 2,567,952 | Lewis | Sept. 18, 1951 |
| 2,668,364 | Colton | Feb. 9, 1954 |
| 2,912,558 | Root | Nov. 10, 1959 |
| 3,015,253 | Foreman | Jan. 2, 1962 |